Patented Jan. 28, 1930

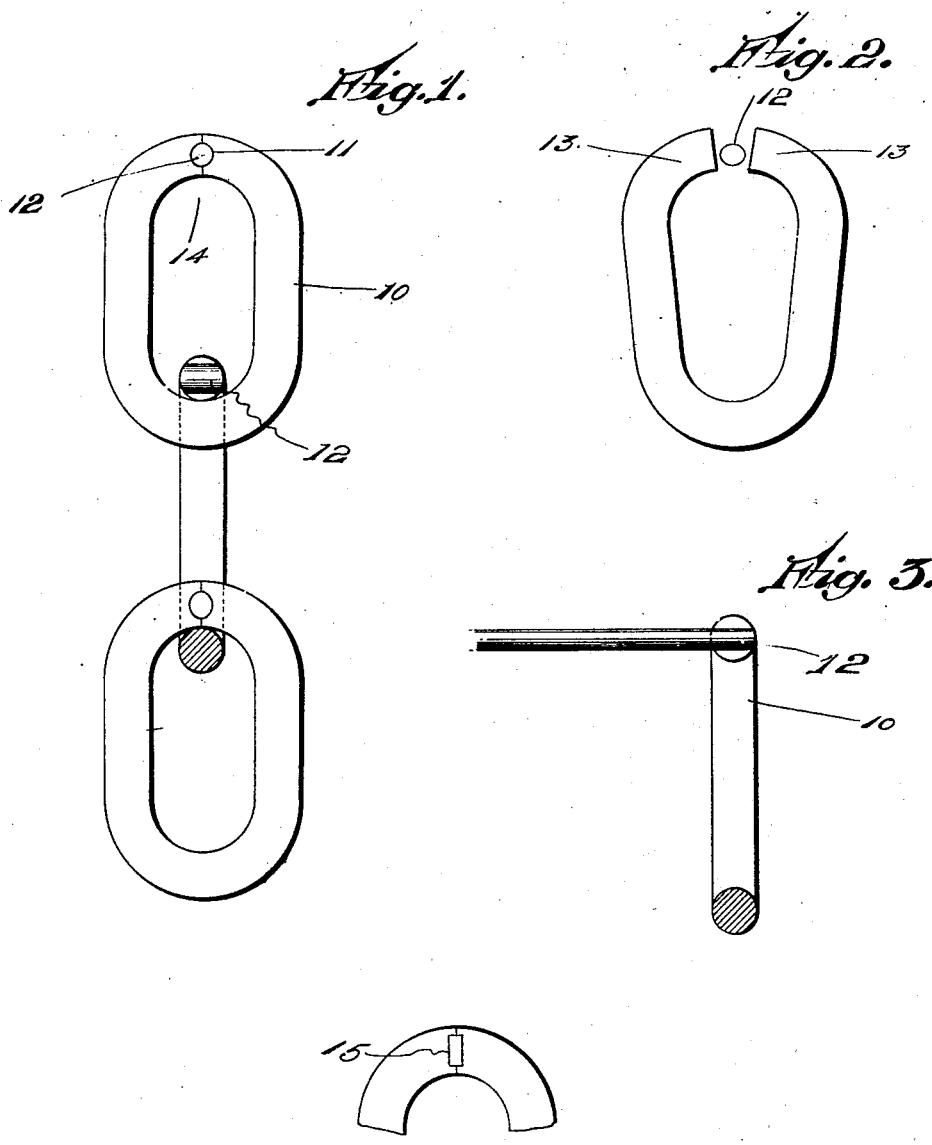

1,744,765

UNITED STATES PATENT OFFICE

JOHN L. HOGBERG, OF ATTLEBORO, MASSACHUSETTS, AND JOHN A. GRANSKOG, OF HILLS GROVE, RHODE ISLAND, ASSIGNORS TO GENERAL CHAIN COMPANY, OF PROVIDENCE, RHODE ISLAND, A CORPORATION OF MASSACHUSETTS

CHAIN LINK

Application filed June 18, 1925. Serial No. 38,052.

This invention relates to an improvement in the construction of chain links and the application of solder to the joint portion of the link; and an object of this invention is to permit the use of plain or solid wire instead of the usual solder cored wire in the manufacture of chain links of this character, to reduce the cost of the chain and also to form a soldered chain whose joints are stronger than the joints formed of solder cored wire.

A further object of the invention is to form the links of the chain of a length of wire by first folding it into loop form and then closing the link by pressure onto a portion of solder, whereby the solder is gripped by and between and imbedded into the ends of the wire at the joint by the closing pressure applied thereto.

With these and other objects in view, the invention consists of certain novel features of construction, as will be more fully described, and particularly pointed out in the appended claims.

In the accompanying drawings:

Figure 1 is an elevation showing some of the links of a chain in section and showing a bar of solder as imbedded into the ends of the wire of the link at the joint.

Figure 2 is a side elevation showing the solder wire as being positioned between the open ends of the link before the same are closed onto the solder to imbed the solder into the ends of the link wire.

Figure 3 is an edge view of the link in section showing the solder wire as being positioned across the face and between the open ends of the link.

Figure 4 is a side elevation showing a bar of solder in ribbon shape as imbedded into the ends of the link at the joint.

Ordinarily in the manufacture of chain for personal wear, it is desired that where the joints of the links should be soldered a so-called solder cored wire is employed, the use of which has a number of disadvantages; among others being that it is much more expensive than the solid or unfilled wire, the soldering of its joints being less reliable than where solder is applied directly to the individual joints, as it often occurs that the core of the wire is broken and there happens to be no solder at the joints to close them when fluxed.

To obviate these difficulties and in order to reduce the cost of the chain and to produce a stronger and better chain, we have provided means as shown and described in our co-pending patent application Serial No. 33,969; filed June 1, 1925, for feeding a length of solder wire between the ends of the link wire prior to closing the same, which closing action causes the link to tightly grip the solder between its ends thus firmly holding the same in position until it is finally subjected to a fluxing heat which automatically solders the joint. Also, it is found in practice of advantage to use so-called hard solder in this soldering operation which in many instances, is harder than the metal of the link wire so that when the ends of the link wire are forced against the hard surface of the solder wire, the latter imbeds itself into the metal of the link and forms a laterally-disposed bar extending across the joints, which bar serves as a key to assist in resisting an opening strain and also at the same time presents a greater soldering area or surface than would the abutting ends of the wire without this recess formed therein, thus again assisting in increasing the strength of the soldered joint of the link; and the following is a detailed description of the present embodiment of our invention and showing a bar of solder of one form as imbedded into the stock of the link at the joints, whereby the above advantageous results may be accomplished:—

With reference to the drawings, 10 designates the links of the chain which are usually formed of very soft wire in order to permit the same to be manipulated properly upon being formed into links by the usual chain machine in which the links are formed into U-shape with their ends slightly spaced and are then subsequently closed to cause them to squarely abut one against the other.

This invention contemplates the construction of a link which is formed by the positioning of a portion of solder 12, which is preferably of a character harder than the soft wire of the link, between the open ends 13 of the link, and subsequently closing the link on to the solder with such force as to imbed the hard solder into the softer abutting ends of the link wire thereby forming a recess 11 in the link ends at the joint and at the same time inserting the bar of solder 12 transversely across the joint 14 of the link.

It is found in practice that when the links of a chain thus formed with a bar of solder extending transversely across the joint that such links form a stronger chain for several reasons; among others being first, that the transverse bar serves as a key to assist the joint to resist an opening strain and so lock the ends against separation; second, the concaved surface of the wire at the joint presents a greater soldering area to the holding action of the solder than would the flat surface of wire ends, resulting in the forming of a much stronger joint and therefore a stronger chain than one formed of the solder cored wire, and again by forming the links of a solid or unfilled wire and positioning just the proper amount of solder between each and every joint, we obtain just the proper amount of solder at the joints, which is not the case where the solder cored wire is employed.

We do not wish to be limited to using a solder wire which is circular in cross section as a wire of ribbon form in cross section may be employed as illustrated at 15 in Figure 4, or a solder portion of any other shape in cross section may be employed, the same being preferably of a less cross-sectional area than that of the wire of the link to which the solder is applied.

The foregoing description is directed solely towards the construction illustrated, but we desire it to be understood that we reserve the privilege of resorting to all the mechanical changes to which the device is susceptible, the invention being defined and limited only by the terms of the appended claims.

We claim:

1. A method of forming a chain link, which consists in bending a length of relatively soft wire into link form with its ends left open, inserting a portion of solder of less cross-sectional area between the ends of the link, and closing the link ends with sufficient force to imbed the solder into the link ends forming a solder-filled groove therein.

2. A chain link of wire having abutting ends forming a joint, a bar of solder of a hardness greater than that of the link wire positioned in said joint and extending transversely across the center portion of said abutting ends, said ends being recessed to accommodate said solder bar, the ends of the bar being exposed on diametrically opposite sides of the joint, and the walls of the recess forming an increased area of contact with the solder.

In testimony whereof we affix our signatures.

JOHN L. HOGBERG.
JOHN A. GRANSKOG.